United States Patent
Haskin

(10) Patent No.: US 9,071,771 B1
(45) Date of Patent: Jun. 30, 2015

(54) RASTER REORDERING IN LASER PROJECTION SYSTEMS

(75) Inventor: Menashe Haskin, Palo Alto, CA (US)

(73) Assignee: Rawles LLC, Wilmington, DE (US)

( * ) Notice: Subject to any disclaimer, the term of this patent is extended or adjusted under 35 U.S.C. 154(b) by 206 days.

(21) Appl. No.: 13/545,158

(22) Filed: Jul. 10, 2012

(51) Int. Cl.
*G03B 21/28* (2006.01)
*H04N 9/31* (2006.01)

(52) U.S. Cl.
CPC ............ *H04N 9/3129* (2013.01); *H04N 9/3197* (2013.01)

(58) Field of Classification Search
CPC ... H04N 9/3129; H04N 9/3197; G03B 21/14; G02B 26/101
USPC ......... 353/30, 31, 38, 69–70, 85, 98, 99, 122, 353/121; 348/240.99, 744, 746, 806; 345/418–420, 536, 503, 533, 557
See application file for complete search history.

(56) References Cited

U.S. PATENT DOCUMENTS

| | | | |
|---|---|---|---|
| 2009/0046259 A1* | 2/2009 | Lach et al. | 353/94 |
| 2009/0091666 A1* | 4/2009 | Kurozuka et al. | 348/744 |
| 2009/0096994 A1* | 4/2009 | Smits | 353/30 |
| 2009/0201589 A1* | 8/2009 | Freeman | 359/630 |
| 2011/0292347 A1* | 12/2011 | Zhang et al. | 353/28 |
| 2012/0013852 A1* | 1/2012 | Champion et al. | 353/31 |
| 2012/0099005 A1* | 4/2012 | Kali et al. | 348/240.99 |
| 2012/0223885 A1 | 9/2012 | Perez | |

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

Office action for U.S. Appl. No. 13/545,158, mailed on Sep. 3, 2014, Haskin et al., "Raster Reordering in Laser Projection Systems", 9 pages.

* cited by examiner

*Primary Examiner* — Sultan Chowdhury
(74) *Attorney, Agent, or Firm* — Lee & Hayes, PLLC

(57) ABSTRACT

Techniques are described for reducing safety-relevant emission of a laser projection system. A multi-facet optical element is positioned in the path of a raster-scanning laser beam. Each facet of the optical element is angled to redirect a projected pixel to a different pixel position. Collectively, the facets are configured to convert the projected raster scan into a non-raster scan in which physically proximate pixels are illuminated temporally non-proximate times.

23 Claims, 3 Drawing Sheets

RASTER REORDERING IN LASER PROJECTION SYSTEMS

BACKGROUND

A large and growing population of people is enjoying entertainment through consumption of digital content items, such as music, movies, images, books and so on. Many people today consume digital content through a wide variety of electronic devices, including optical projectors or other projection devices.

Laser beams may be used to by certain projection systems to project visual images onto projection surfaces. Laser-based projection systems have advantages over more traditional projection techniques, including the ability to package such systems in relatively small form factors.

Despite the advantages of laser-based projection systems, there is concern over their safety. In particular, laser beams of sufficient brightness may cause damage if directed through the pupil of a human eye.

An acceptable exposure limit (AEL) for lasers is defined by the International Electrotechnical Commission (IEC) by measuring the energy of the laser beam through a measurement aperture having a diameter of 7 millimeters, at a distance of 100 millimeters from the projection source. The AEL is expressed as a maximum power during an exposure time. The specified 7 millimeter diameter represents the maximum dilation of the human eye.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described below are systems and techniques for limiting or reducing the safety-relevant energy density created by laser image projection. For purposes of this discussion, the safety-relevant energy density is assumed to be measured with respect to an aperture having a fixed or maximum size. For example, the International Electrotechnical Commission (IEC) specifies safety-relevant energy density measurements to be made using an aperture diameter of 7 millimeters.

A projection source generates a modulated laser beam and sweeps or directs the laser beam in path that projects the pixels of an image in a raster sequence to form a frame of pixels. A pixel frame consists of multiple lines or rows of pixels. The projection source sweeps across the pixels of a single line in what is referred to as a raster scan. The projection source performs repeated raster scans across adjacent lines of pixels in order to illuminate all pixels of the frame.

In the embodiments described herein, a multi-facet optical element is positioned in the path of the laser beam to pseudo-randomly redistribute or redirect the laser beam from its originally targeted pixel to a different pixel of the displayed image frame. The facets of the optical element may be configured or oriented to convert the raster-scanning pattern of the laser source to a more random or distributed pattern, in which physically proximate pixels are not projected in temporal proximity to each other. This has the effect of reducing safety-relevant energy density when measured as described above.

Figure 1:
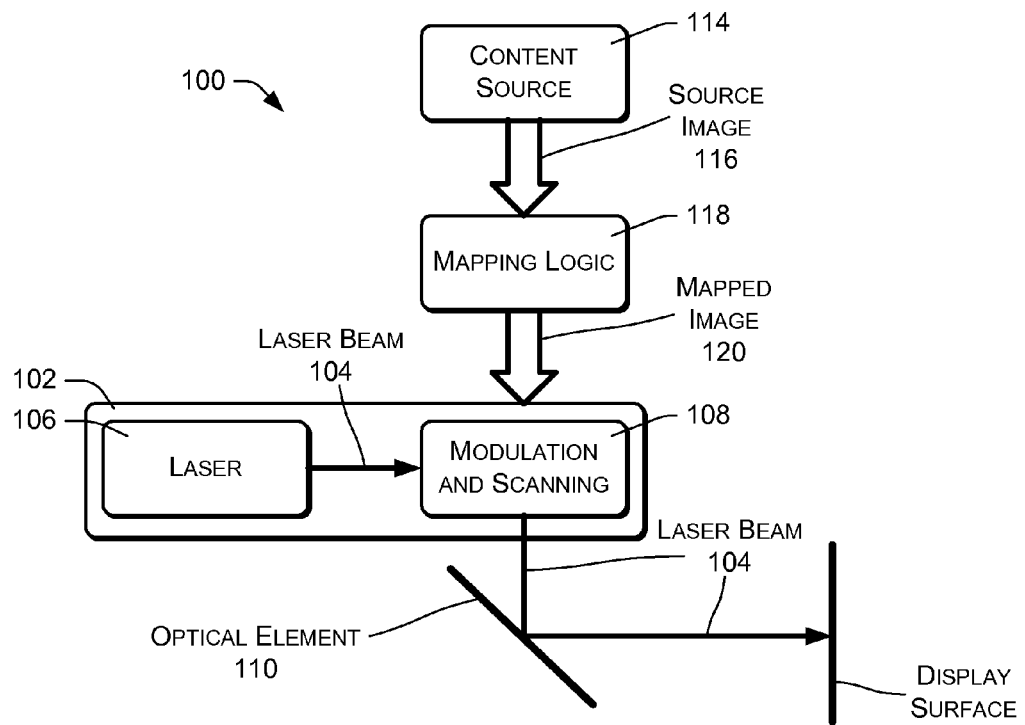
FIG. 1 is a block diagram of a laser projection system that is configured to reduce safety-relevant laser emissions.

FIG. 1 illustrates an optical projection system 100 that reduces or limits safety-relevant laser emissions in accordance with these techniques. The system 100 comprises a projection source 102 configured to direct a modulated laser beam 104 in a raster sequence of pixel positions.

The projection source 102 may include a laser source 106 that generates the laser beam 104, and associated modulating and scanning components 108 that provide color and/or intensity modulation of the laser beam 104 in response to an analog signal or a digital data stream. The modulating and scanning components 108 also direct or redirect the laser beam 104 in a raster sequence of pixel positions. More specifically, the modulation and scanning components 108 direct the laser beam 104 across individual rows or lines of pixel positions in a raster scanning pattern. For example, the laser beam 104 is directed so that it sweeps across a contiguous raster line of pixel positions, then sweeps across an adjacent line of pixel positions, and repeats this process until the laser beam 104 has been directed across all raster lines. Within a single raster line, the laser beam 104 is repeatedly directed from one pixel position to an adjacent pixel position until all pixels of the raster line have been covered.

Figure 2:
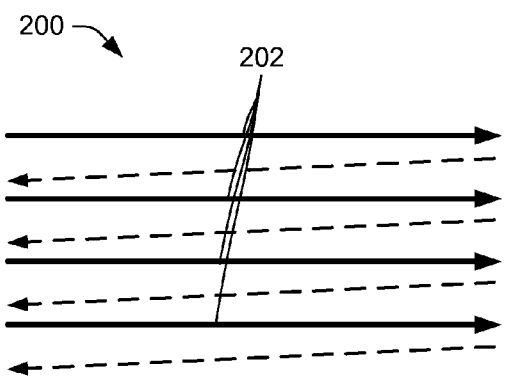
FIG. 2 a diagram illustrating a raster pixel pattern or sequence.

FIG. 2 shows an example of a raster scanning pattern 200, which comprises a vertical sequence of horizontal raster lines 202. The laser beam 104 sweeps through or across the multiple pixel positions of a line 202 in the direction indicated, and then retraces (indicated by dashed lines) and repeats with an adjacent line. In this example, the lines are scanned left-to-right and top-to-bottom, whereupon the process is repeated.

Returning to FIG. 1, a multi-facet optical element 110 is positioned in the path of the laser beam 104 to intercept and redirect the laser beam 104. In the illustrated embodiment the optical element 110 comprises a multi-facet mirror, although the optical element 110 may comprise a multi-facet lens in other embodiments. The optical element 110 is stationary relative to the laser source, although it may be movable in other embodiments.

The multi-facet optical element 110 redirects the laser beam 104 to a projection or display surface 112, where it forms an image in accordance with the provided content or source image 114. Although the optical element 110 in the illustrated embodiment is shown as being between the projection source 102 and the display surface 112, it could alternatively be positioned at other points along the path of the laser beam 104, including at positions within the projection source 102.

Figure 3:
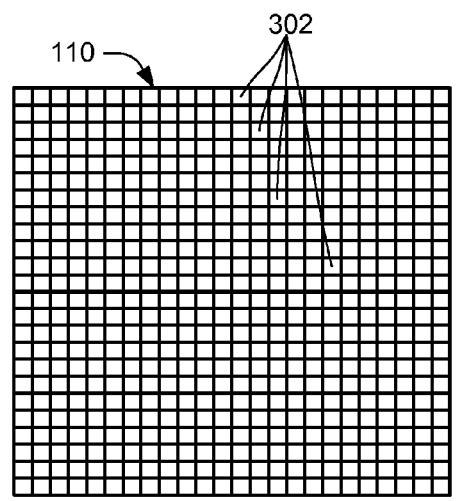
FIG. 3 is a diagram of a multi-facet optical element that may be used in certain embodiments to re-order the pixel sequence of a laser projections system.

FIG. 3 shows an example of the multi-facet optical element 110. The optical element 110 has a plurality of individual facets or panes 302, arranged in a raster pattern comprising a vertical sequence of raster lines. In this embodiment, each of the facets 302 corresponds in position to an individual pixel of the raster pattern that is projected by the projection source 102. As an example, the projection source may be intended to generate an image having a resolution of 800×600 pixels. In this example, the multi-facet optical element may comprise a grid of 800×600 facets or panes 302, each of which corresponds to a single pixel.

Each facet 302 may be planar, and may be oriented or angled to intercept and redirect the laser beam 104 when the laser beam is directed to a corresponding pixel position. Individually, each of the facets is configured to redirect the laser beam 104 from one of the pixel positions at which the laser beam 104 has been directed to another of the pixel positions. Collectively, the facets 302 are configured to redistribute the regular raster pattern of pixels generated by the projection source 102 into a non-regular or pseudo-random projection pattern of pixels, in which proximate pixel positions are scanned or illuminated at non-proximate times. The non-regular projection pattern is designed to reduce emitted energy density to a measurement area of a predefined size, such as the 7 millimeter measurement aperture mentioned above.

The non-regular projection pattern may in some embodiments be configured to appear random or pseudo-random, rather than being sequenced by line and row. The non-regular projection pattern results in a non-raster, non-contiguous pixel sequence, in which physically adjacent pixels are illuminated at non-adjacent times.

In some embodiments, the individual facets 302 may be non-planar. For example, image or pixel enlargement may be achieved in some embodiments by making the individual facets 302 convex or concave.

Figure 4:
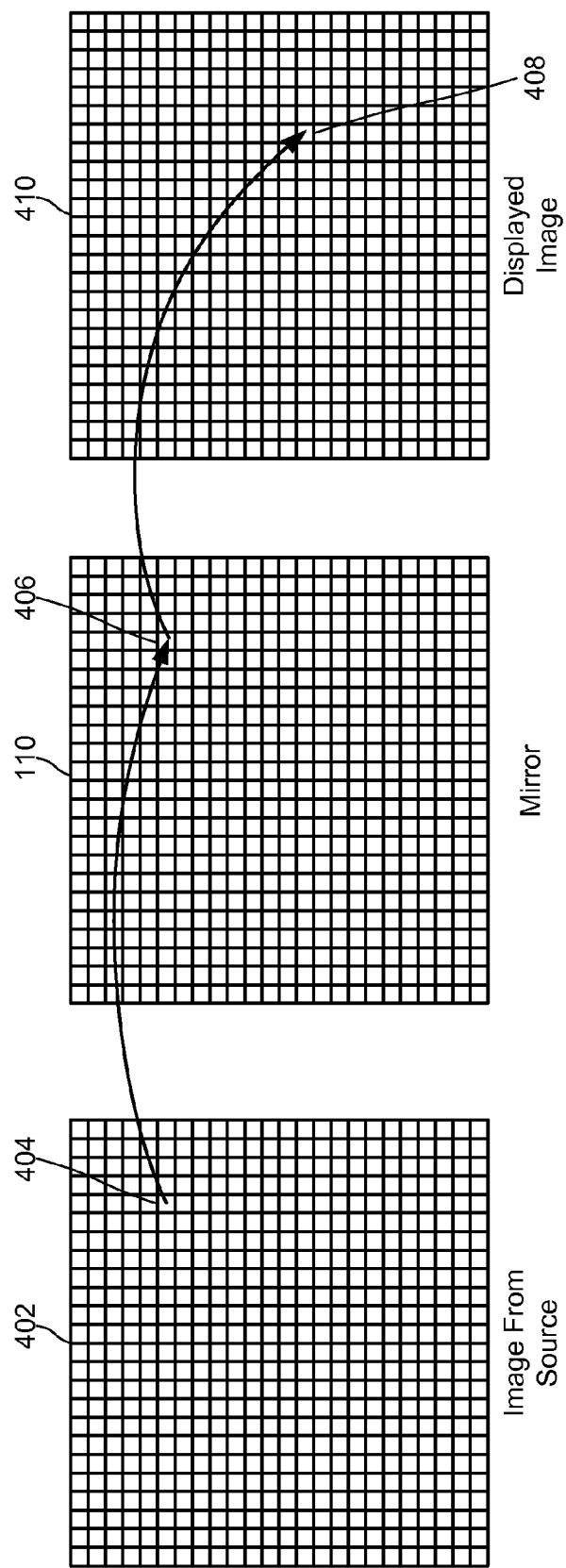
FIG. 4 is a block diagram illustrating a re-ordering of the pixel sequence that may be implemented by the multi-facet optical element of FIG. 3.

FIG. 4 illustrates an example of the source-to-display pixel mapping performed by the optical element 110, with respect to a single pixel and pixel position. A source image 402, comprising a raster array of pixels, is supplied by the projection source 102 and intercepted or received by the optical element 110. More specifically, a projected pixel 404 of the source image 402 impinges upon a corresponding facet 406 of the optical element 110, and is reflected or redirected by the optical element 110 to form a pixel 408 of a displayed image 410. However, the facet 406 is angled to redirect the source image pixel 404 onto the position of a different or non-corresponding pixel 408 of the displayed image relative to the source image 402. That is, the pixel 404 of the source image does not correspond in physical position with the pixel 408 at which the pixel is directed by the facet 406 of the optical element 110.

Returning to FIG. 3, the facets 302 may be angled differently with respect to each other, to distribute or re-order projected pixel positions into non-corresponding displayed pixel positions. The optical element 110 may be designed so that the re-ordering appears to be random as between various pixel positions, and so that nearby display pixels are not illuminated in close time proximity to each other.

Referring again to FIG. 1, the system 100 may include a content or image source 114 that generates a source image 116. The source image 116 comprises a plurality of pixels in a raster order. Each of the pixels is associated with or corresponds to a pixel position at which it is to be displayed on the display surface 112.

The system 100 may also include a processing component or mapping logic 118, which is configured to receive the source image 116 and to reorder its pixels to produce a reordered or mapped image 120. The pixels are ordered within the reordered image 120 to account for the eventual remapping that will be performed by the multi-facet optical element 110, so that each pixel is eventually projected at its associated pixel position. The projection source 102 receives the mapped image 120 and projects the pixels in a raster pattern, which is converted by the optical element 110 into a non-raster pattern.

Figure 5:
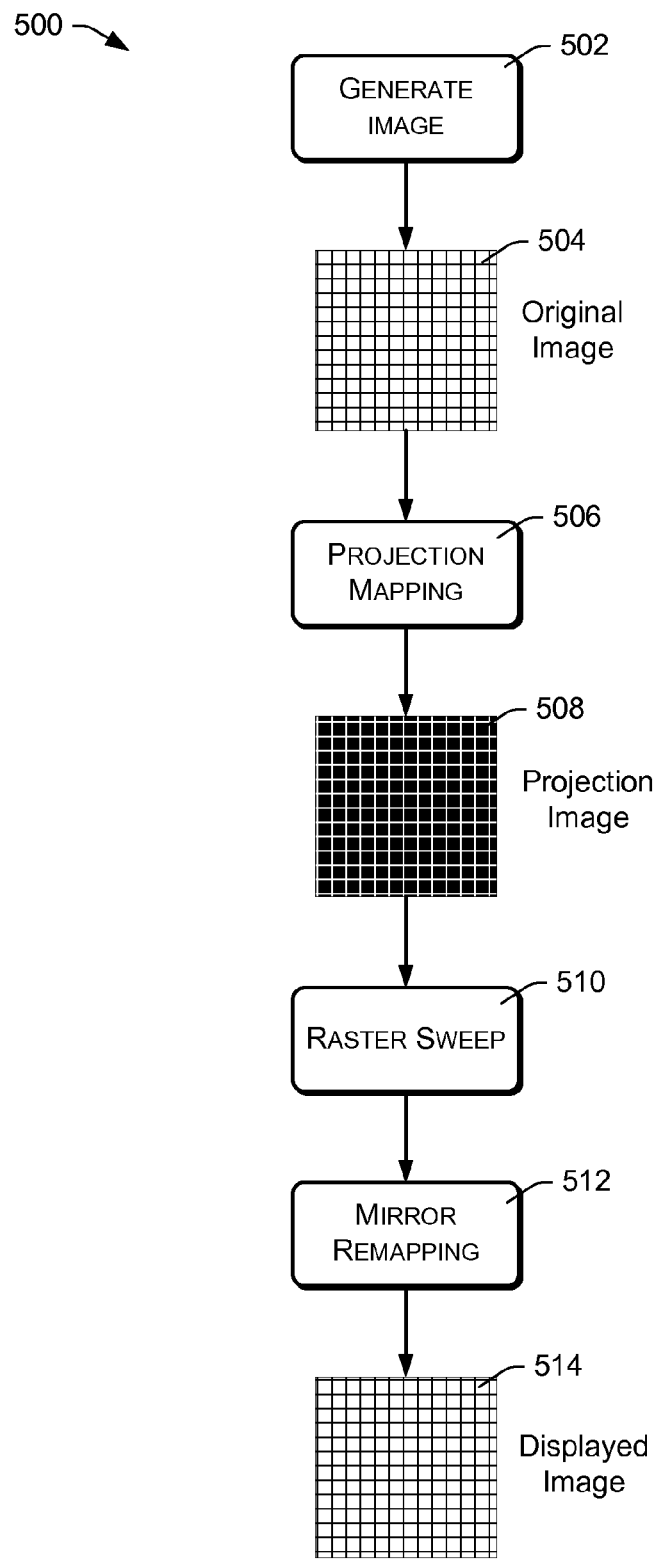
FIG. 5 is a flow diagram illustrating an example method of generating an image in conjunction with a laser source.

FIG. 5 illustrates a method 500 of projecting a displayed image in accordance with the techniques described above. An action 502 comprises generating an original raster image or image frame 504, comprising a pattern or frame of pixels as described above, in which individual pixels are specified in a raster order. An action 506 comprises mapping or remapping the pixels of the original image 504 in accordance with the anticipated re-ordering or redistribution that will subsequently be performed by the multi-facet optical element 110, to produce a re-ordered projection image 508. The action 506 rearranges the pixels of the original image 504 so that their subsequent re-ordering by the optical element 110 will result in displaying the original image 504. The projection mapping 506 may be performed within or by the projector or projection source 102, or by an external content source prior to providing the content to the projection source 102.

An action 510 comprises sweeping the laser beam 104 across adjacent raster lines to project the re-ordered projection image 508 onto a display surface.

An action 512, which is performed in the described embodiment by the multi-facet optical element 110, comprises remapping the projection image 508 to redistribute the pixels of the projection image on a displayed image 514. The action 512 converts the regular raster scanning pattern produced in the action 510 to a non-regular, non-raster, or pseudo-random pattern, in which the laser energy projected within a given time frame to a given measurement area is within desired or specified safety limits.

The description to this point has assumed a one-to-one correspondence between image pixels and facets of the optical element 110. In some embodiments, however, the optical element 110 may have a different or non-corresponding number of facets as compared to the pixels of the projected image.

As an example, the optical element 110 may have fewer facets than image pixels, and each facet may correspond in position to multiple pixels. Thus, a number of adjacent or proximate pixels may impinge upon the same facet. Depending upon image resolution, this may still achieve levels of pixel redistribution that are sufficient to meet desired safety requirements.

Furthermore, an optical element such as described above, having fewer facets than image pixels, may be mechanically tilted in an oscillating fashion during raster scanning in order distribute the projection of the multiple pixels that impinge upon each particular facet.

In other embodiments, the horizontal-to-vertical ratio of facets of the optical element 110 may not correspond to the horizontal-to-vertical ratio of image pixels. For example, an optical element having a given horizontal-to-vertical facet ratio may be configured so that its facets are directed to form a displayed image having a different horizontal-to-vertical pixel ratio. In this situation, the projection source 102 may be configured to account for this transformation in the projection mapping action 506 (FIG. 5).

It should also be noted that an optical element having a relatively high facet resolution may be used to project an image having a lower pixel resolution, by skipping some of the facets when modulating the laser beam through each line of facets.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An optical projection system comprising:
   an image source configured to generate a source image, the source image comprising a plurality of pixels in a first order for projection onto a display surface at associated pixel positions;
   a processing component configured to reorder the pixels of the source image in a second order to produce a reordered image;
   a projection source configured to direct a laser beam that projects the reordered pixels of the reordered image in a raster sequence; and
   an optical element positioned in a path of the laser beam, the optical element having multiple facets, wherein each of the facets is configured to redirect light of a particular projected pixel of the reordered image to its associated pixel position on the display surface such that the plurality of pixels of a resulting image on the display surface is ordered in the first order.

2. The optical projection system of claim 1, wherein the multiple facets are configured to redirect the laser beam in a non-contiguous sequence of the pixel positions.

3. The optical projection system of claim 1, wherein the multiple facets are configured to reduce a continuous energy density emitted by the laser beam when measured across a measurement area of a predefined size.

4. The optical projection system of claim 1, wherein the optical element is stationary relative to the projection source.

5. The optical projection system of claim 1, wherein the optical element has a facet corresponding to each of the pixel positions.

6. The optical projection system of claim 1, wherein each facet of the optical element corresponds to a plurality of the pixel positions.

7. The optical projection system of claim 1, wherein the pixel positions have a first horizontal-to-vertical ratio and the facets of the optical element have a second, different horizontal-to-vertical ratio.

8. The optical projection system of claim 1, wherein individual facets of the optical elements are non-planar.

9. The optical projection system of claim 1, wherein the optical element comprises a mirror.

10. The optical projection system of claim 1, wherein the optical element comprises a lens.

11. A method comprising:
    generating, by an image source, a source image, the source image comprising a plurality of pixels in a first order for projection onto a display surface at associated pixel positions;
    reordering, by a processing component, the pixels of the source image in a second order to produce a reordered image;
    directing, by a projection source, a laser beam that projects the reordered pixels of the reordered image in a raster sequence; and
    redirecting, by each facet of multiple facets of an optical element positioned in a path of the laser beam, light of a particular projected pixel of the reordered image to its associated pixel position on the display surface such that the plurality of pixels of a resulting image on the display surface is ordered in the first order.

12. The method of claim 11, wherein the laser beam is redirected in a non-contiguous sequence of the pixel positions.

13. The method of claim 11, wherein the pixel positions have a first horizontal-to-vertical ratio and the facets of the optical element have a second, different horizontal-to-vertical ratio.

14. The method of claim 11, wherein individual facets of the optical elements are non-planar.

15. The method of claim 11, wherein the optical element comprises a mirror.

16. The method of claim 11, wherein the optical element comprises a lens.

17. An optical projection system comprising:
    one or more processors;
    a memory;
    instructions stored in the memory that, when executed by the one or more processors, cause the one or more processors to:
      generate a source image, the source image comprising a plurality of pixels in a first order for projection onto a display surface at associated pixel positions;
      reorder the pixels of the source image in a second order to produce a reordered image;
      direct a laser beam that projects the reordered pixels of the reordered image in a raster sequence; and
    an optical element positioned in a path of the laser beam, the optical element having multiple facets, wherein each of the facets is configured to redirect light of a particular projected pixel of the reordered image to its associated pixel position on the display surface such that the plurality of pixels of a resulting image on the display surface is ordered in the first order.

18. The optical projection system of claim 17, wherein the multiple facets are configured to redirect the laser beam in a non-contiguous sequence of the pixel positions.

19. The optical projection system of claim 17, wherein the multiple facets are configured to reduce a continuous energy density emitted by the laser beam when measured across a measurement area of a predefined size.

20. The optical projection system of claim 17, wherein the optical element is stationary relative to a projection source.

21. The optical projection system of claim 17, wherein the optical element has a facet corresponding to each of the pixel positions.

22. The optical projection system of claim 17, wherein each facet of the optical element corresponds to a plurality of the pixel positions.

23. The optical projection system of claim 17, wherein the pixel positions have a first horizontal-to-vertical ratio and the facets of the optical element have a second, different horizontal-to-vertical ratio.

* * * * *